United States Patent
Kim et al.

(10) Patent No.: US 11,092,084 B2
(45) Date of Patent: Aug. 17, 2021

(54) FUEL DELIVERY SYSTEM FOR A GAS TURBINE ENGINE

(71) Applicant: General Electric Company, Schenectady, NY (US)

(72) Inventors: Kwanwoo Kim, Montgomery, OH (US); Raymond Floyd Martell, Sharonville, OH (US); Alfred Albert Mancini, Cincinnati, OH (US); Clayton S. Cooper, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 410 days.

(21) Appl. No.: 15/164,946

(22) Filed: May 26, 2016

(65) Prior Publication Data

US 2017/0342912 A1    Nov. 30, 2017

(51) Int. Cl.
*F02C 7/22* (2006.01)
*F02C 9/26* (2006.01)
(Continued)

(52) U.S. Cl.
CPC .............. *F02C 9/26* (2013.01); *F02C 7/222* (2013.01); *F02C 7/228* (2013.01); *F23R 3/28* (2013.01);
(Continued)

(58) Field of Classification Search
CPC .. F02C 7/222; F02C 7/228; F02C 7/22; F16L 55/04; F16L 55/05; F05D 2260/964
See application file for complete search history.

(56) References Cited

U.S. PATENT DOCUMENTS 3,793,838 A     2/1974   Nash
5,263,314 A *  11/1993   Anderson ............... F02C 7/222
                                                        137/312
(Continued)

FOREIGN PATENT DOCUMENTS

EP      0 726 387 A2    8/1996
EP      2 249 083 A2   11/2010
(Continued)

OTHER PUBLICATIONS

Invitation to pay additional fees issued in connection with corresponding PCT Application No. PCT/US2017/028478 dated Jul. 11, 2017.
(Continued)

*Primary Examiner* — Todd E Manahan
*Assistant Examiner* — Alyson Joan Harrington
(74) *Attorney, Agent, or Firm* — Venable LLP; Edward A. Kmett; Michele V. Frank

(57) ABSTRACT

A gas turbine engine includes a combustion section, the combustion section including a plurality of fuel nozzles. A fuel delivery system for the gas turbine engine includes a feed tube and a fuel manifold fluidly connected to the feed tube for receiving fuel from the feed tube. The fuel delivery system also includes a pigtail fuel line fluidly connected to the fuel manifold and configured to fluidly connect to a fuel nozzle of the plurality of fuel nozzles when the fuel delivery system is installed in the gas turbine engine. In order to reduce an amount of hydraulic instability of a fuel flow through the fuel delivery system, at least one of the fuel manifold or the pigtail fuel line includes a means for damping a hydraulic instability within the fuel delivery system.

20 Claims, 5 Drawing Sheets

(51) Int. Cl.
*F02C 7/228* (2006.01)
*F23R 3/28* (2006.01)
*F23R 3/34* (2006.01)

(52) U.S. Cl.
CPC .......... *F23R 3/346* (2013.01); *F05D 2220/32* (2013.01); *F05D 2240/35* (2013.01); *F05D 2260/964* (2013.01); *Y02T 50/60* (2013.01)

(56) References Cited

U.S. PATENT DOCUMENTS

| | | | |
|---|---|---|---|
| 5,369,952 A | 12/1994 | Walters | |
| 7,272,931 B2 | 9/2007 | Held et al. | |
| 7,992,390 B2 | 8/2011 | Patel et al. | |
| 8,037,690 B2 | 10/2011 | Morenko et al. | |
| 8,769,954 B2 | 7/2014 | Fiebig et al. | |
| 9,140,453 B2 | 9/2015 | Kojovic et al. | |
| 9,970,357 B2* | 5/2018 | Fletcher | F02C 7/222 |
| 2002/0083987 A1 | 7/2002 | Dooley | |
| 2011/0048021 A1* | 3/2011 | Slobodyanskiy | F01D 9/023 60/725 |
| 2013/0340438 A1* | 12/2013 | Abreu | F02C 7/222 60/772 |
| 2015/0233581 A1* | 8/2015 | Cutler | F02C 7/222 60/739 |
| 2015/0315969 A1* | 11/2015 | Fisher | F02C 7/222 60/739 |
| 2016/0108818 A1* | 4/2016 | Fletcher | F02C 7/222 60/739 |
| 2016/0177836 A1* | 6/2016 | Wickstrom | F23R 3/28 60/772 |
| 2016/0201562 A1* | 7/2016 | Chasse, Jr. | F02C 7/22 60/739 |
| 2017/0030583 A1* | 2/2017 | Fujii | F02C 7/20 |
| 2017/0067590 A1* | 3/2017 | Hanner | F16L 55/041 |

FOREIGN PATENT DOCUMENTS

| | | | | |
|---|---|---|---|---|
| EP | 2910751 A1 | 8/2015 | | |
| EP | 3034945 A1 * | 6/2016 | ................ | F23R 3/28 |
| WO | WO2014/173660 A1 | 10/2014 | | |

OTHER PUBLICATIONS

International Search Report and Written Opinion issued in connection with corresponding PCT Application No. PCT/US2017/028478 dated Sep. 1, 2017.

* cited by examiner

FUEL DELIVERY SYSTEM FOR A GAS TURBINE ENGINE

FIELD OF THE INFORMATION

The present subject matter relates generally to a fuel delivery system for a gas turbine engine.

BACKGROUND OF THE INVENTION

Gas turbine engines include a combustion section in which fuel is burned to input heat to the engine cycle. Gas turbine engines may operate using one or several types or combinations of fuel, such as propane, ethane, hydrogen, or jet fuel. Additionally, the combustion section may include one of several types of combustors (e.g., can, cannular, annular) for burning such fuel.

Typical combustion sections incorporate one or more fuel nozzles whose function is to receive the fuel and introduce such fuel into an air flow stream so that it can atomize and burn. Gas turbine engines additionally include a fuel delivery system for providing fuel from, e.g., one or more fuel tanks to the combustion section, or more particularly, to the one or more fuel nozzles of the combustion section.

However, during operation of the gas turbine engine, the fuel delivery system may be subjected to vibrations or other mechanical perturbations affecting the delivery of fuel to the one or more fuel nozzles. For example, the inventors of the present disclosure have found that such vibrations can cause the fuel within the fuel delivery system to flow in an inconsistent manner. More specifically, the inventors have found that the fuel may flow in accordance with a mechanical resonance consistent with the vibrations and mechanical perturbations. These inconsistencies in the fuel flow through the fuel delivery system can create inconsistent fuel delivery to the fuel nozzles, potentially resulting in undesirable combustion dynamics. Accordingly, a fuel delivery system capable of providing fuel to the fuel nozzles of the combustion section more consistently would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a fuel delivery system is provided for a gas turbine engine including a combustion section. The combustion section of the gas turbine engine includes a plurality of fuel nozzles. The fuel delivery system includes a feed tube and a fuel manifold fluidly connected to the feed tube for receiving fuel from the feed tube. The fuel delivery system additionally includes a pigtail fuel line fluidly connected to the fuel manifold and configured to fluidly connect to a fuel nozzle of the plurality of fuel nozzles. At least one of the fuel manifold or the pigtail fuel line includes a means for damping a hydraulic instability within the fuel delivery system.

In another exemplary embodiment of the present disclosure, a fuel delivery system is provided for a gas turbine engine including a combustion section. The combustion section of the gas turbine engine includes a plurality of fuel nozzles. The fuel delivery system includes a feed tube and a fuel manifold fluidly connected to the feed tube for receiving fuel from the feed tube. The fuel delivery system additionally includes a plurality of pigtail fuel lines fluidly connected to the fuel manifold, each pigtail fuel line configured to fluidly connect to a fuel nozzle of the plurality of fuel nozzles of the combustion section of the gas turbine engine. At least one of the fuel manifold or a first pigtail fuel line in the plurality of pigtail fuel lines includes an expansion damper for damping a hydraulic instability within the fuel delivery system.

In still another exemplary embodiment of the present disclosure, a gas turbine engine is provided. The gas turbine engine includes a combustion section comprising a plurality of fuel nozzles and a fuel delivery system. The fuel delivery system includes a feed tube and a fuel manifold fluidly connected to the feed tube for receiving fuel from the feed tube. The fuel delivery system additionally includes a pigtail fuel line extending between and fluidly connecting the fuel manifold to a fuel nozzle of the plurality of fuel nozzles of the combustion section. At least one of the fuel manifold or the pigtail fuel line includes a means for damping a hydraulic instability within the fuel delivery system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings.

Figure 1:
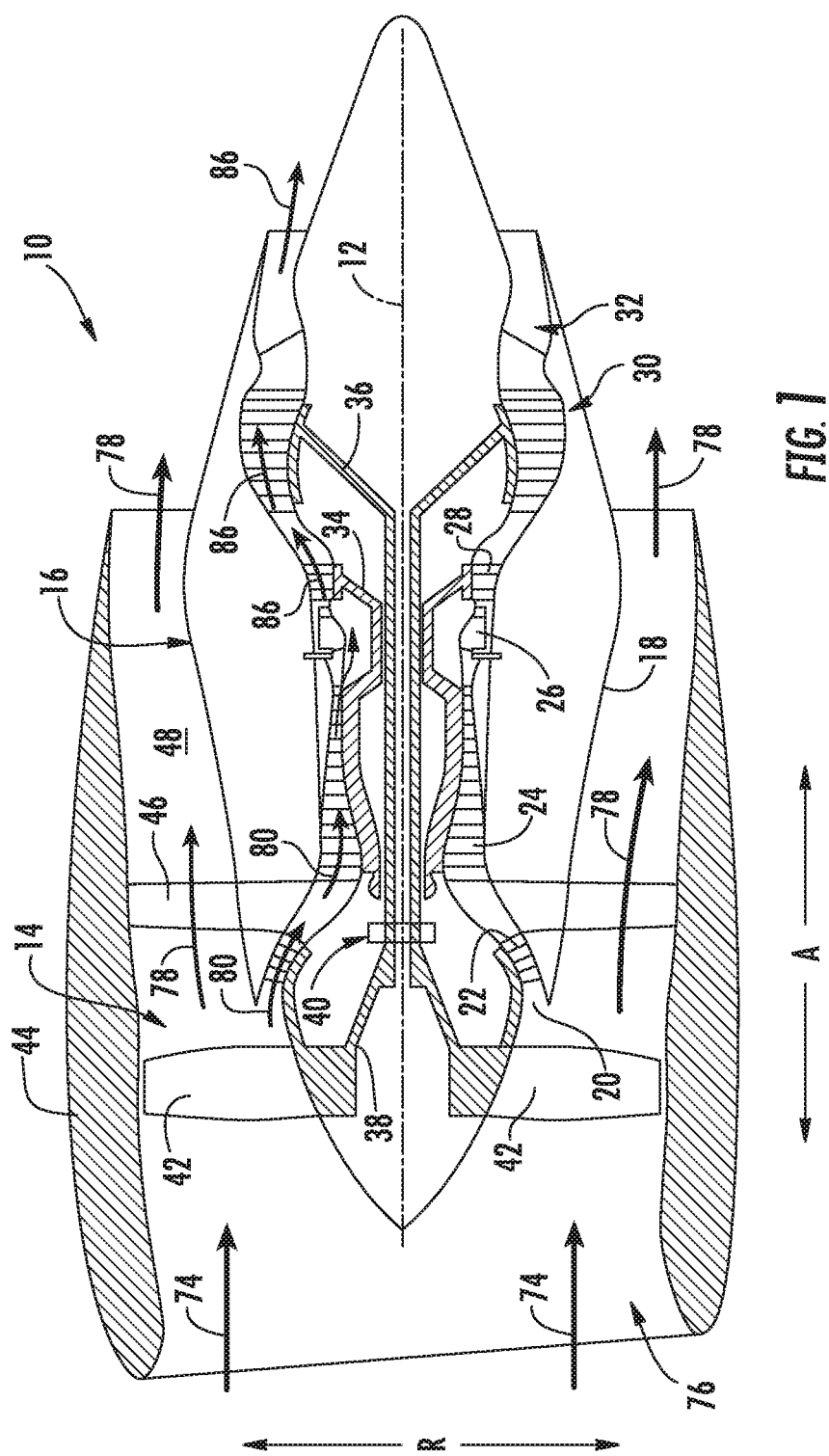
FIG. 1 is a schematic cross-sectional view of a gas turbine engine in accordance with an exemplary embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. Additionally, the terms "upstream" and "downstream" refer to the relative direction with respect to fluid flow in a fluid pathway. For example, "upstream" refers to the direction from which the fluid flows, and "downstream" refers to the direction to which the fluid flows.

As is described in greater detail below, the present disclosure generally relates to a means for damping a hydraulic instability (or acoustic instability) within a fuel delivery system of a gas turbine engine. During operation of the gas turbine engine, the inventors have found that various vibrations and other mechanical fluctuations can generate a hydraulic instability within the fuel delivery system. Such hydraulic instability can include hydro-mechanical fluid perturbations potentially resulting in inconsistent fuel delivery to a plurality of fuel nozzles of respective combustors within a combustion section of the gas turbine engine. Further, such hydraulic instability may therefore lead to undesirable combustion dynamics, hardware damage, and/or limited operability.

Accordingly, the inventors of the present disclosure have provided a means for damping such hydraulic instability to reduce combustion dynamics, potentially limit hardware damage, and maintain a desired operability. As will be discussed in greater detail below, the means for damping such hydraulic instability may include one or more of the following: (1) an expansion damper within a fuel manifold of the fuel delivery system; (2) an expansion damper within one or more of a plurality of pigtail fuel lines of the fuel delivery system; (3) a variable geometry of the plurality of pigtail fuel lines of the fuel delivery system; (4) a jumper fuel line fluidly connecting a first fuel manifold and a second fuel manifold; and (5) an inconsistent attachment spacing of the plurality of pigtail fuel lines to the fuel manifold of the fuel delivery system.

Referring now to the drawings, FIG. 1 is a schematic partially cross-sectioned side view of an exemplary high by-pass turbofan jet engine 10 herein referred to as "turbofan 10" as may incorporate various embodiments of the present invention. The turbofan 10 defines an axial direction A, a radial direction R, and a circumferential direction C (i.e., a direction extending about the axial direction A, not shown). As shown in FIG. 1, the turbofan 10 has a longitudinal or axial centerline axis 12 that extends therethrough for reference purposes. In general, the turbofan 10 includes a fan assembly 14 and a core turbine engine 16 disposed downstream from the fan assembly 14.

The core turbine engine 16 may generally include a substantially tubular outer casing 18 that defines an annular inlet 20. The outer casing 18 encases or at least partially forms, in serial flow relationship, a compressor section having a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, such as the embodiment depicted in FIG. 1, the LP rotor shaft 36 may be connected to the fan shaft 38 via a reduction gear 40 such as in an indirect-drive or geared-drive configuration. However, in other embodiments, the turbofan 10 may instead be configured as a direct drive engine, not including the reduction gear 40.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core turbine engine 16. For the embodiment depicted, the nacelle 44 is supported relative to the core turbine engine 16 by a plurality of circumferentially-spaced outlet guide vanes or struts 46. Moreover, at least a portion of the nacelle 44 extends over an outer portion of the core turbine engine 16 so as to define a bypass airflow passage 48 therebetween.

During operation of the turbofan 10, a volume of air as indicated schematically by arrows 74 enters the turbofan 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26.

Within the combustion section 26, the compressed air 80 from the HP compressor 24 and LP compressor 22 is mixed with fuel and combusted in a combustion chamber (not labeled), generating combustion gases 86. The combustion gases 86 generated in the combustion chamber flow from the combustion section 26 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core turbine engine 16 to provide propulsive thrust.

It should be appreciated, however, that the exemplary turbofan 10 depicted in FIG. 1 is provided by way of example only. In other exemplary embodiments of the present disclosure, the turbofan engine 10 may have any other suitable configuration. Additionally, or alternatively, in still other embodiments, aspects of the present disclosure may be incorporated into any other suitable gas turbine engine. For example, in other embodiments, aspects of the present disclosure may be incorporated into a turboprop engine, a turbojet engine, a turboshaft engine, etc. Notably, aspects of the present disclosure may further be incorporated into land-based gas turbine engines, such as power generation gas turbine engines, and/or into aero-derivative gas turbine engines.

Figure 2:
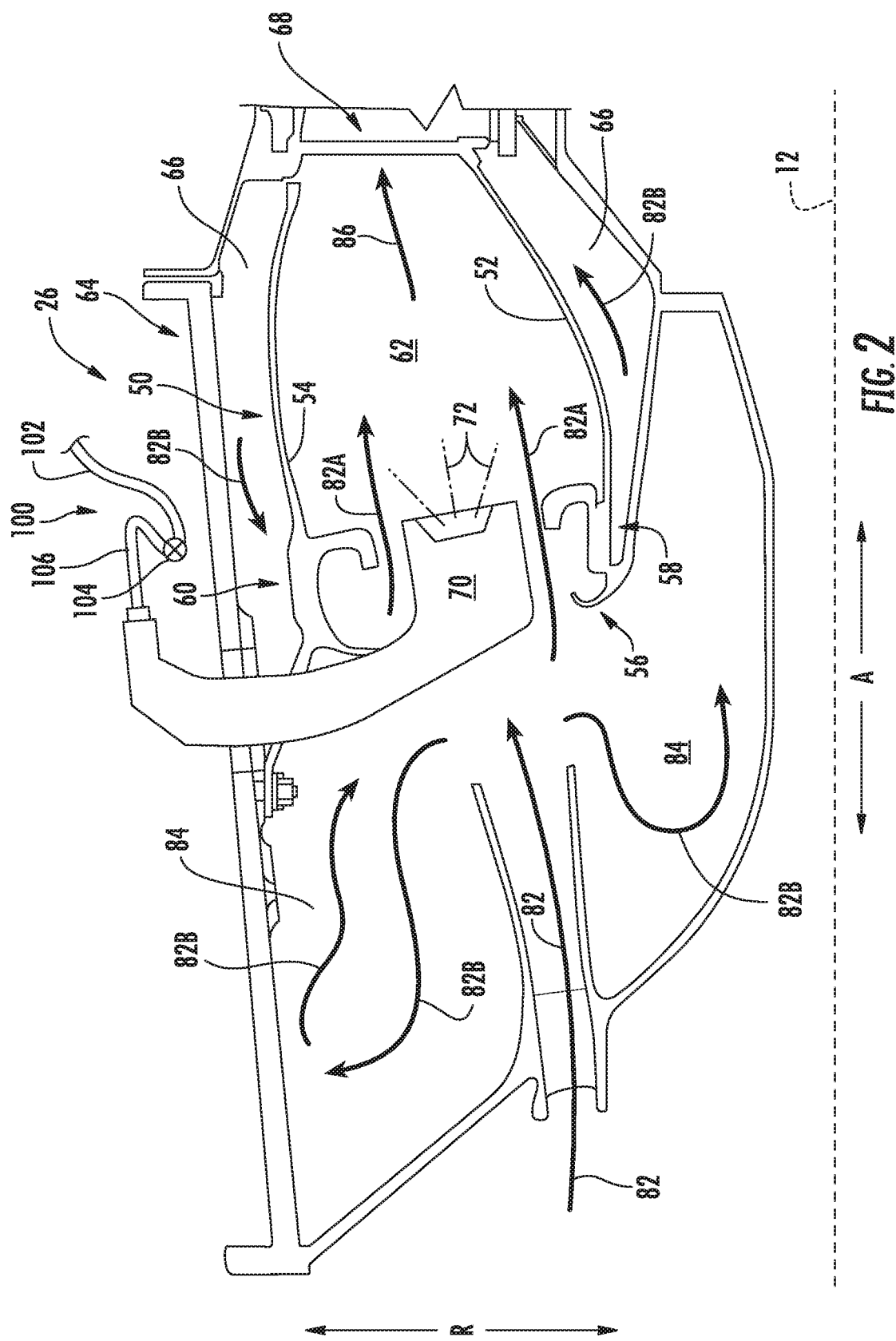
FIG. 2 is a cross sectional, side view of a combustion section of a gas turbine engine in accordance with an exemplary embodiment of the present disclosure.

Referring now to FIG. 2, a cross-sectional, side view of a combustion section 26 of a gas turbine engine in accordance with an exemplary embodiment of the present disclosure is provided. In certain exemplary embodiments, the combustion section 26 may be configured as the combustion section 26 for the core turbine engine 16 of FIG. 1. However, in other embodiments, the combustion section 26 may be incorporated into any other suitable gas turbine engine.

As shown in FIG. 2, the combustion section 26 may generally include an annular type combustor 50 having an annular inner liner 52, an annular outer liner 54 and a generally domed end 56 that extends radially between upstream ends 58, 60 of the inner liner 52 and the outer liner 54, respectfully. However, in other embodiments the combustion section 26 may instead include a cannular type combustor, a can type combustor, or any other suitable combustor.

As shown in FIG. 2, the inner liner 52 is radially spaced from the outer liner 54 with respect to engine centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 are encased within a combustor or outer casing 64. An outer flow passage 66 is defined around the inner liner 52 and/or the outer liner 54. The inner liner 52 and the outer liner 54 extend from the domed end 56 towards a turbine nozzle or inlet 68 to the HP turbine 28 (see, e.g., FIG. 1), thus at least partially defining a hot gas path between the combustor 50 and the HP turbine 28. For the embodiment depicted, a fuel nozzle 70 is provided extending through the outer casing 64 and at least partially through the domed end 56 to the combustion chamber 62. The fuel nozzle 70 provides a fuel (or a fuel/air mixture) 72 to the combustion chamber 62. It should be appreciated that, although not depicted, the combustion section 26 includes a plurality of fuel nozzles 70 spaced generally along the circumferential direction C of the gas turbine engine (i.e., a direction extending about the axial direction A; not shown).

The gas turbine engine with which the combustion section 26 depicted is configured additionally includes a fuel delivery system 100. The fuel delivery system 100 generally includes a feed tube 102 fluidly connected to, e.g., one or more fuel pumps, fuel metering valves, fuel tanks, etc. (not shown). Further, the fuel delivery system 100 includes a fuel manifold 104 fluidly connected to the feed tube 102 for receiving fuel from the feed tube 102, and a pigtail fuel line 106 fluidly connected to the fuel manifold 104 and configured to fluidly connect to a fuel nozzle 70 of the plurality of fuel nozzles 70. More specifically, although not depicted, as will be described in greater detail below, the fuel delivery system 100 further includes a plurality of pigtail fuel lines 106 spaced along the circumferential direction C, each pigtail fuel line 106 extending between and fluidly connecting the fuel manifold 104 to a respective fuel nozzle 70 of the plurality of fuel nozzles 70.

As shown in FIG. 2, the combustion section 26 is configured to receive compressed air 82 from, e.g., a compressor section of the gas turbine engine. The compressed air 82 enters the combustion section 26 through a diffuser cavity or head end portion 84 of the combustion section 26, where the compressed air 82 is further pressurized. A first portion of the of the compressed air 82, as indicated schematically by arrows 82A flows from the diffuser cavity 84 into the combustion chamber 62 where it is mixed with the fuel 72 and burned, thus generating combustion gases 86 within the combustor 50. In certain embodiments, more compressed air is provided to the diffuser cavity 84 than is needed for combustion. Therefore, a second portion of the compressed air 82 as indicated schematically by arrows 82B may be used for various purposes other than combustion. For example, as shown in FIG. 2, compressed air 82B may be routed into the outer flow passage 66 to provide cooling to the inner and outer liners 52, 54. In addition, or in the alternative, at least a portion of compressed air 82B may be routed out of the diffuser cavity 84. For example, a portion of compressed air 82B may be directed through various flow passages to provide cooling air to a turbine section of the gas turbine engine into which the combustion section is installed.

Figure 3:
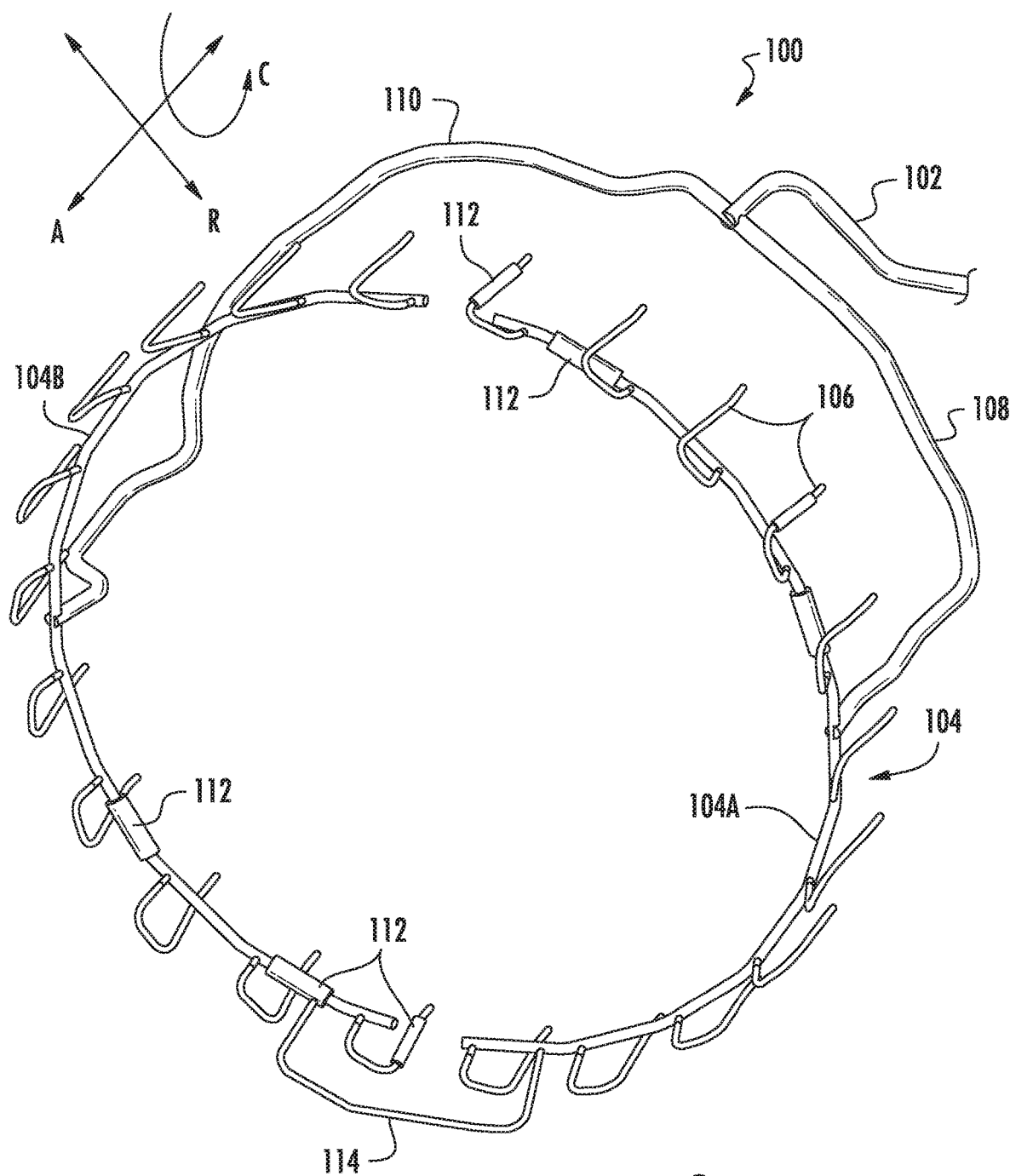
FIG. 3 is a perspective view of a fuel delivery system in accordance with an exemplary embodiment of the present disclosure.

Referring now to FIG. 3, a perspective, isolated view is provided of a fuel delivery system 100 for a gas turbine engine in accordance with an exemplary embodiment of the present disclosure. The exemplary fuel delivery system 100 depicted in FIG. 3 may be configured in substantially the same manner as the exemplary fuel delivery system 100 described above with reference to FIG. 2. Accordingly, the exemplary fuel delivery system 100 depicted in FIG. 3 may be configured for a gas turbine engine having a combustion section 26 (such as the turbofan 10 of FIG. 1), the combustion section 26 including a plurality of fuel nozzles 70 (such as the exemplary combustion section 26 of FIG. 2). The exemplary fuel delivery system 100 defines an axial direction A, a radial direction R, and a circumferential direction C, which may align with the axial, radial, and circumferential directions A, R, C of the gas turbine engine into which is installed (see FIG. 1).

As is depicted, the exemplary fuel delivery system 100 generally includes a feed tube 102, a fuel manifold 104, and a pigtail fuel line 106, or rather a plurality of pigtail fuel lines 106. The feed tube 102 may be fluidly connected to various other components of the fuel delivery system 100, such as one or more fuel pumps, fuel valves, and/or fuel tanks (not shown). The fuel manifold 104 is fluidly connected to the feed tube 102 for receiving fuel from the feed tube 102, and each of the plurality of pigtail fuel lines 106 are fluidly connected to the fuel manifold 104 and configured to fluidly connect to a fuel nozzle 70 of the plurality of fuel nozzles 70.

More specifically, for the embodiment depicted, the fuel manifold 104 includes a first fuel manifold 104A and a separate, second fuel manifold 104B. Similarly, the feed tube 102 includes a first branch 108 and a second branch 110. The first and second fuel manifolds 104A, 104B are fluidly connected to the feed tube 102 through the first and second branches 108, 110 of the feed tube 102, respectively, for receiving fuel from the feed tube 102. As is depicted, each of the first fuel manifold 104A and second fuel manifold 104B extend generally along the circumferential direction C. Such a configuration may allow for the plurality of pigtail fuel lines 106 connected thereto to more easily extend to the fuel nozzles 70 of the gas turbine engine when installed (see FIG. 2). Notably, in other embodiments the fuel manifold 104 include any other suitable number of fuel manifold sections. For example, in other embodiments, the fuel manifold 104 may further include a third fuel manifold, a fourth fuel manifold, etc. Alternatively, the fuel manifold 104 may in still other embodiments only include a single fuel manifold.

The inventors of the present disclosure have discovered that vibrations and other mechanical perturbations of the gas turbine engine and fuel delivery system 100 may result in a hydraulic instability within the fuel delivery system 100. For example, such vibrations and mechanical perturbations may result in hydro-mechanical fluid perturbations (i.e., fluctuations in the fuel flow or pressure), potentially resulting in combustion dynamics, hardware damage, and/or limited operability. Accordingly, for the exemplary fuel delivery system 100 depicted, at least one of the fuel manifold 104 or a pigtail fuel line 106 (of the plurality of pigtail fuel lines 106) includes a means for damping a hydraulic instability within the fuel delivery system 100. More specifically, for the embodiment depicted in FIG. 3, each of the first and second fuel manifolds 104A, 104B and one or more of the pigtail fuel lines 106 include a means for damping a hydraulic instability within the fuel delivery system 100.

Particularly for the embodiment depicted, the means for damping the hydraulic instability included in the first and second fuel manifolds 104A, 104B are an expansion damper 112 of the first fuel manifold 104A and an expansion damper 112 of the second fuel manifold 104B, or rather a plurality of expansion dampers 112 of the first fuel manifold 104A and a plurality of expansion dampers 112 of the second fuel manifold 104B.

Figure 4:
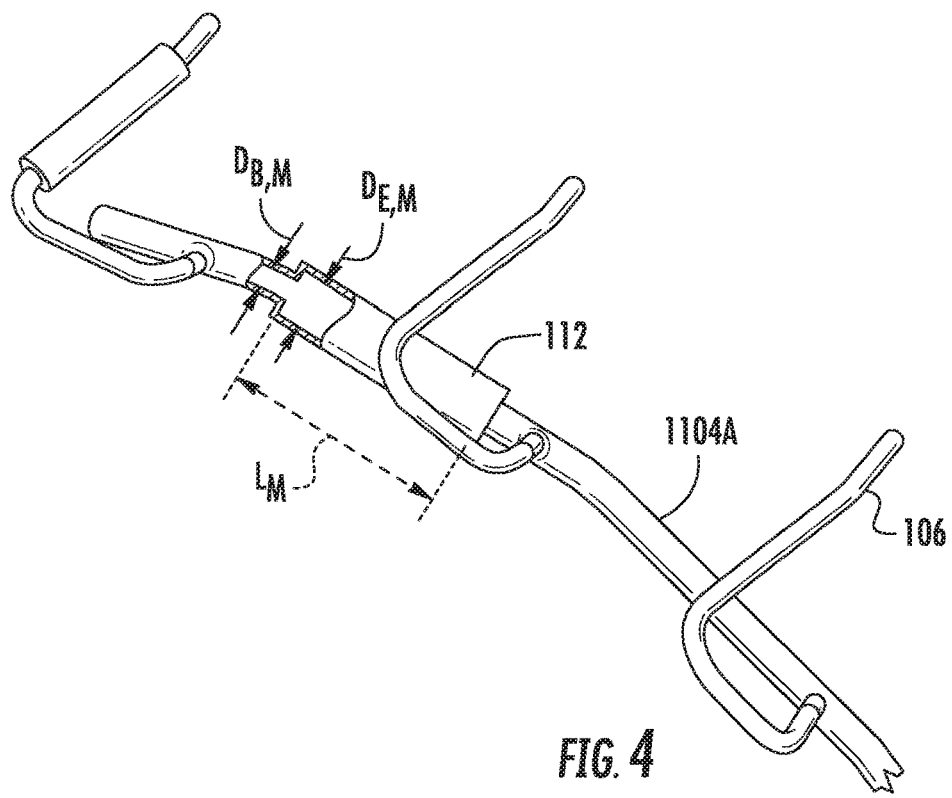
FIG. 4 is a close-up view of the exemplary fuel delivery system of FIG. 3.

Referring now also to FIG. 4, providing a close-up, partially cross-sectioned view of an expansion damper 112 of the first fuel manifold 104A, the expansion damper 112 is configured as a portion of the first fuel manifold 104A having a greater inner diameter. For example, the first fuel manifold 104A defines a baseline inner diameter $D_{B,M}$, e.g., immediately downstream and immediately upstream of the expansion damper 112. Additionally, the first fuel manifold 104A defines an expanded inner diameter $D_{E,M}$ within the expansion damper 112, and a length $L_M$ of the expansion damper 112. The length $L_M$ of the expansion damper 112 is a length along a centerline of the first fuel manifold 104A. Notably, for the embodiment depicted, the first fuel manifold 104A defines a constant expanded inner diameter $D_{E,M}$ along the length $L_M$ of the expansion damper 112. However, in other embodiments, the first fuel manifold 104A may instead define a variable expanded inner diameter $D_{E,M}$ along the length $L_M$ of the expansion damper 112. With such an embodiment, the expanded inner diameter $D_{E,M}$ may be an average expanded inner diameter along the length $L_M$ of the expansion damper 112.

Referring still to FIGS. 3 and 4, for the embodiment depicted, the first fuel manifold 104A defines a ratio $D_{E,M}:D_{B,M}$ of the expanded inner diameter $D_{E,M}$ to the baseline inner diameter $D_{B,M}$ and a ratio $L_M:D_{B,M}$ of the length $L_M$ of the expansion damper 112 to the baseline inner diameter $D_{B,M}$. For the embodiment depicted, the ratio $D_{E,M}:D_{B,M}$ of the expanded inner diameter $D_{E,M}$ to the baseline inner diameter $D_{B,M}$ is greater than about 1.2 and is less than about 4. For example, in certain embodiments, the ratio $D_{E,M}:D_{B,M}$ of the expanded inner diameter $D_{E,M}$ to the baseline inner diameter $D_{B,M}$ may be greater than about 1.4 and less than about 2.5. Also for the embodiment depicted, the ratio $L_M:D_{B,M}$ of the length $L_M$ of the expansion damper 112 to the baseline inner diameter $D_{B,M}$ is greater than about five (5) and less than about twenty-five (25). For example, in certain embodiments, the $L_M:D_{B,M}$ of the length $L_M$ of the expansion damper 112 to the baseline inner diameter $D_{B,M}$ may be greater than about twelve (12) and less than about eighteen (18). It should be appreciated, that as used herein, terms of approximation, such as "about" and "approximate," refer to being within a 10% margin of error.

Referring again generally to FIG. 3, as is depicted one or more of the plurality of pigtail fuel lines 106 additionally include a means for damping the hydraulic instability of the fuel delivery system 100. Specifically, for the embodiment of FIG. 3 a plurality of the pigtail fuel lines 106 fluidly connected to the first fuel manifold 104A and a plurality of the pigtail fuel lines 106 fluidly connected to the second fuel manifold 104B include a means for damping the hydraulic instability of the fuel delivery system 100. For the embodiment of FIG. 3, each of the means for damping the hydraulic instability of the fuel delivery system 100 of the pigtail fuel lines 106 is also configured as an expansion damper 112 of the respective pigtail fuel line 106.

Figure 5:
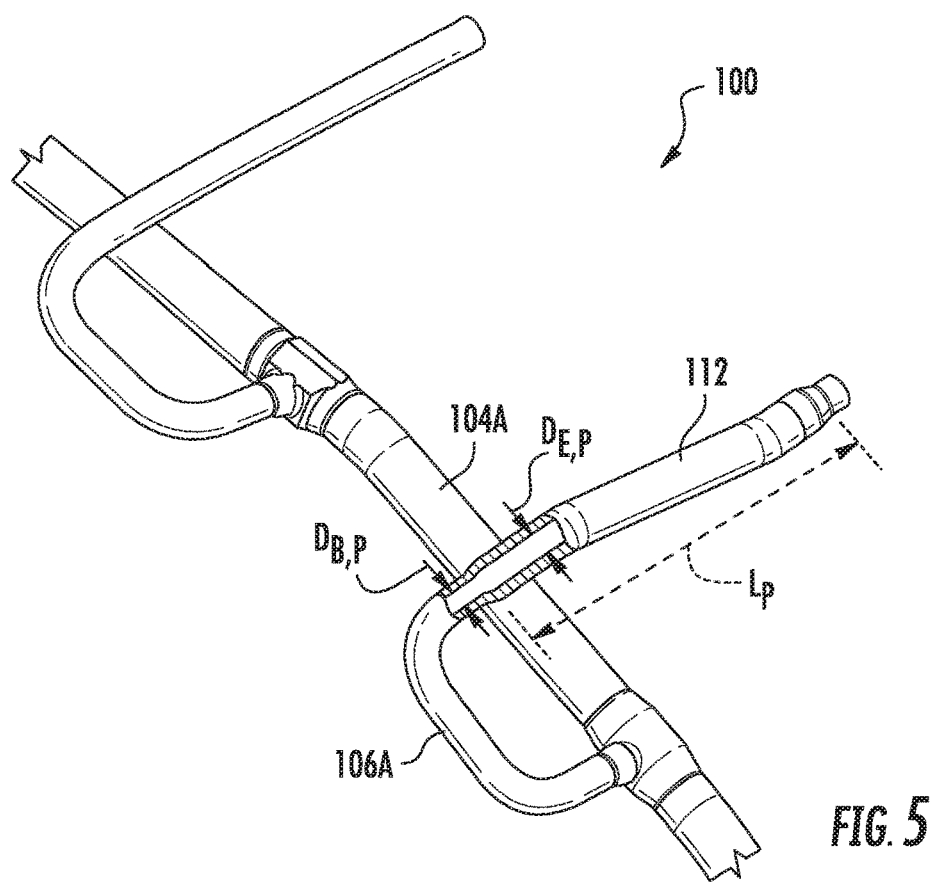
FIG. 5 is another close up view of the exemplary fuel delivery system of FIG. 3.

Referring also to FIG. 5, a close-up, partially cross-sectioned view of a first pigtail fuel line 106A of the plurality of pigtail fuel lines 106 including an expansion damper 112 is provided. The expansion damper 112 of the first pigtail fuel line 106A depicted in FIG. 5 may be configured in substantially the same manner as the exemplary expansion damper 112 of the first fuel manifold 104A described above with reference to FIG. 4. For example, for the embodiment depicted, the first pigtail fuel line 106A defines a baseline inner diameter $D_{B,P}$ immediately upstream of the expansion damper 112. Additionally, the first pigtail fuel line 106A defines an expanded inner diameter $D_{E,P}$ within the expansion damper 112, and a length $L_P$ of the expansion damper 112. The length $L_P$ of the expansion damper 112 is a length along a centerline of the first pigtail fuel line 106A. For the embodiment depicted, a ratio $D_{E,M}:D_{B,M}$ of the expanded inner diameter $D_{E,M}$ to the baseline inner diameter $D_{B,M}$ is greater than about 1.2 and less than about 4, such as greater than about 1.4 and less than about 2.5. Also for the embodiment depicted, a ratio $L_P:D_{B,P}$ of the length $L_P$ of the expansion damper 112 to the baseline inner diameter $D_{B,P}$ is greater than about five (5) less than about twenty-five (25), such as greater than about twelve (12) and less than about eighteen (18).

Inclusion of one or more expansion dampers 112 in the first fuel manifold 104A, the second fuel manifold 104B, and/or one or more of the pigtail fuel lines 106 may disrupt a flow of fuel therethrough, reducing an amount of hydraulic instability within the fuel delivery system 100. Specifically, disrupting the flow of fuel by utilizing one or more expansion dampers 112 may disrupt an amount of hydraulic instability through such portion of the fuel delivery system 100.

Referring again particularly to FIG. 3, as noted the fuel manifold 104 of the fuel delivery system 100 includes the first fuel manifold 104A and the second fuel manifold 104B. Each of the first fuel manifold 104A and second fuel manifold 104B are separately fluidly connected to the feed tube 102 via the first and second branches 108, 110 of the feed tube 102 for receiving fuel. Additionally, for the embodiment depicted, the means for damping and hydraulic instability within the fuel delivery system 100 included with the fuel manifold 104 further includes a jumper fuel line 114. The jumper fuel line 114 is fluidly connected to both the first fuel manifold 104A and the second fuel manifold 104B, such that the first fuel manifold 104A is fluidly connected to the second fuel manifold 104B. Such a configuration may allow for the first fuel manifold 104A to fluidly communicate with the second fuel manifold 104B, reducing an overall hydraulic instability of the fuel delivery system 100, and more particularly, reducing an amount of hydraulic instability within the fuel manifold 104.

Although not depicted, in certain embodiments, the jumper fuel line 114 may additionally include an expansion damper along its centerline to provide for additional acoustic damping of pressure fluctuations. Moreover, a connection location of the first branch 108 of the feed tube 102 to the first fuel manifold 104A and a connection location of the second branch 110 of the feed tube 102 to the second fuel manifold 104B may be altered to intentionally change an acoustic resonance of the fuel delivery system 100 in addition to the means for providing hydraulic damping discussed herein. For example, although for the embodiments depicted the first branch 108 is connected to the first fuel manifold 104A approximately at a center of the first fuel manifold 104A, in other embodiments, the first branch 108 of the feed tube 102 may be attached proximate a first end of the first fuel manifold 104A or alternatively, proximate an opposite second end of the first fuel manifold 104A. Similarly, although for the embodiments depicted the second branch 110 is connected to the second fuel manifold 104B approximately at a center of the second fuel manifold 104B, in other embodiments, the second branch 110 of the feed tube 102 may be attached proximate a first end of the second fuel manifold 104B or alternatively, proximate an opposite second end of the second fuel manifold 104B.

It should be appreciated, however, that although the fuel manifold 104 includes a plurality of means for reducing a hydraulic instability of the fuel delivery system 100, in other embodiments, the fuel manifold 104 may not include all such means. It should also be appreciated that although a plurality of the pigtail fuel lines 106 depicted in FIG. 3 include a means for reducing a hydraulic instability of the fuel delivery system 100, in other embodiments, any other suitable number of the pigtail fuel lines 106 may include such means. Alternatively, as will be discussed in greater detail below, in still other embodiments, neither the fuel manifold 104, nor any of the plurality of pigtail fuel lines 106 may include the means for reducing a hydraulic instability of the fuel delivery system 100 described above. Instead, in other embodiments, one or both of the fuel manifold 104 or a pigtail fuel line 106 of the plurality of pigtail fuel lines 106 may include any other suitable means damping a hydraulic instability of the fuel delivery system 100.

Figure 6:
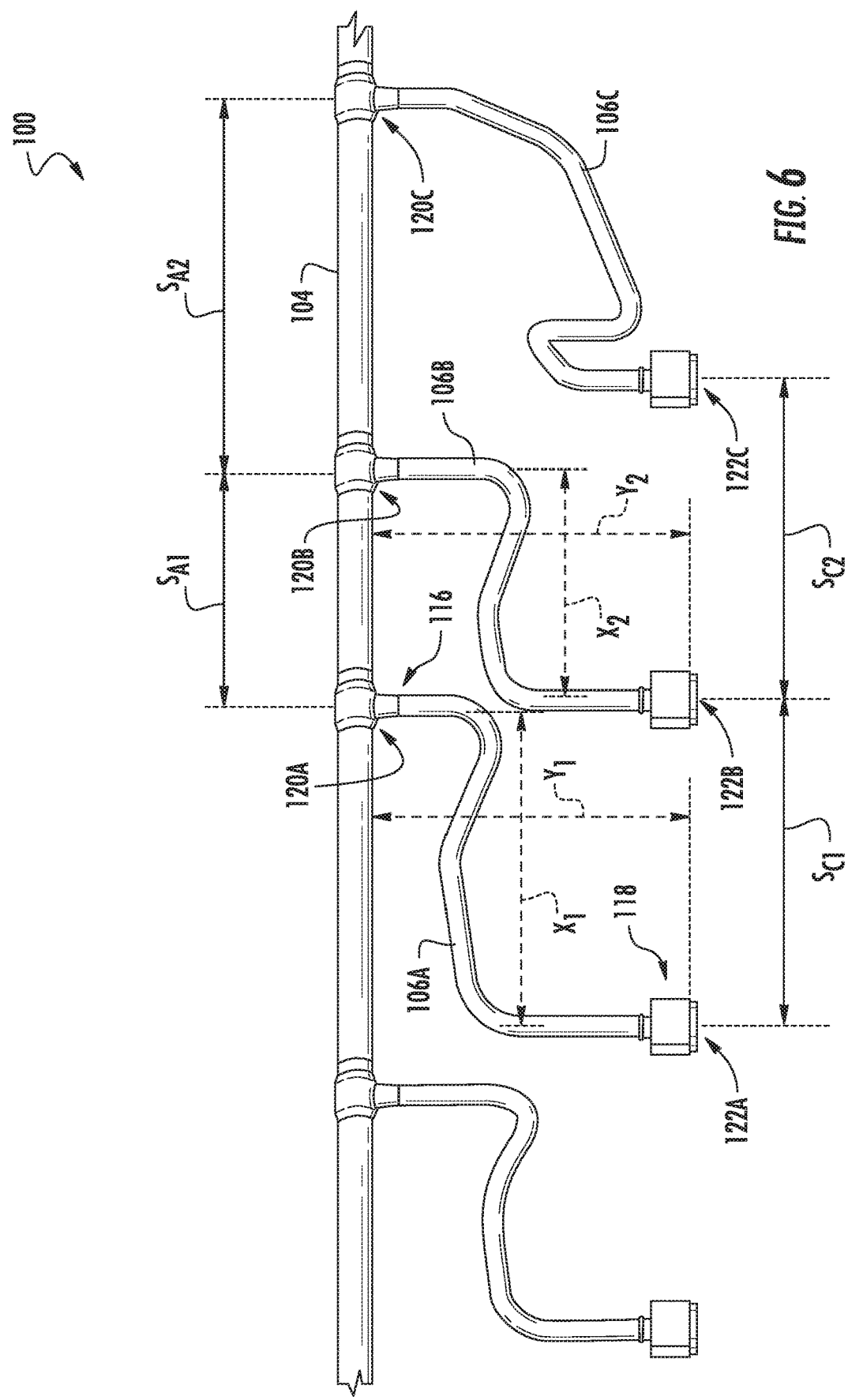
FIG. 6 side view of a fuel delivery system in accordance with another exemplary embodiment of the present disclosure.

For example, reference will now be made to FIG. 6, depicting a section of a fuel delivery system 100 for a gas turbine engine in accordance with another exemplary embodiment of the present disclosure. The exemplary fuel delivery system 100 depicted in FIG. 6 may be configured in substantially the same manner as exemplary fuel delivery system 100 described above with reference to FIGS. 3 through 5. For example, the exemplary fuel delivery system 100 of FIG. 6 includes a fuel manifold 104 fluidly connected to a feed tube 102 (not depicted) for receiving fuel from the feed tube 102. Additionally, the exemplary fuel delivery system 100 includes a pigtail fuel line 106 fluidly connected to the fuel manifold 104 and configured to fluidly connect to a fuel nozzle 70 (see FIG. 2). More specifically, for the embodiment depicted, the exemplary fuel delivery system 100 includes a plurality of pigtail fuel lines 106 fluidly connected to the fuel manifold 104 and configured to be fluidly connected to a fuel nozzle 70. Notably, each of the plurality of pigtail fuel lines 106 extends between a first end 116 and a second end 118. The first end 116 of each of the plurality of pigtail fuel lines 106 is attached to the fuel manifold 104 at an attachment point 120 of the fuel manifold 104. Additionally, the second ends 118 of each of the plurality of pigtail fuel lines 106 define a connection point 122 for connecting to a fuel nozzle 70 of a combustion section 26 of the gas turbine engine.

Moreover, for the exemplary fuel delivery system 100 of FIG. 6, at least one of the fuel manifold 104 or a pigtail fuel line 106 of the plurality of pigtail fuel lines 106 includes a means for damping a hydraulic instability within the fuel delivery system 100. However, for the embodiment depicted, the means for damping the hydraulic instability within the fuel delivery system 100 is instead provided in the form of a varied spacing of the pigtail fuel lines 106 along the fuel manifold 104 and also in the form of a varied geometry of the pigtail fuel lines 106.

For example, the exemplary fuel manifold 104 depicted includes a means for damping the hydraulic instability, with the means for damping the hydraulic instability being a varied spacing of the plurality of attachment points 120 along the fuel manifold 104. For example, the fuel manifold 104 includes a first attachment point 120A, a second attachment point 120B, and a third attachment point 120C. Similarly, the plurality of pigtail fuel lines 106 provided with the exemplary fuel delivery system 100 of FIG. 6 includes a first pigtail fuel line 106A, a second pigtail fuel line 106B, and a third pigtail fuel line 106C. As is depicted, the first pigtail fuel line 106A is attached to the fuel manifold 104 at the first attachment point 120A, the second pigtail fuel line 106B is attached to the fuel manifold 104 at the second attachment point 120B, and the third pigtail fuel line 106C is attached the fuel manifold 104 at the third attachment point 120C. The second attachment point 120B is spaced from the first attachment point 120A a first distance $S_{A1}$, and the third attachment point 120C is spaced from the second attachment point 120B a second distance $S_{A2}$. For the embodiment depicted, the second distance $S_{A2}$ is not equal to the first distance $S_{A1}$, and more particularly, the second distance $S_{A2}$ is greater than the first distance $S_{A1}$, for example, at least five percent (5%) greater or at least ten percent (10%) greater.

Moreover, at least certain of the plurality of pigtail fuel lines 106 define variable geometries. For example, the first pigtail fuel line 106A defines a first geometry, the second pigtail fuel line 106B defines a second geometry, and the third pigtail fuel line 106C defines a third geometry. For the embodiment depicted, each of the first, second, and third geometries are distinct from one another, i.e., the first geometry is distinct from the second and third geometries and the second geometry is also distinct from the first and third geometries.

Notably, for the embodiment depicted, the variable geometries of the pigtail fuel lines 106 is due at least in part to the varied spacing of the attachment points 120 of the fuel manifold 104. More specifically, although a spacing of the attachment points 120 is varied, the connection points 122 at the second ends 118 of the plurality of pigtail fuel lines 106 must be constant. For example, a first connection point 122A of the first pigtail fuel line 106A, a second connection point 122B of the second pigtail fuel line 106B, and a third connection point 122C of the third pigtail fuel line 106C must each be equally spaced apart. Accordingly, as is depicted, the first and second connection points 122A, 122B define a first spacing $S_{C1}$ and the second and third connection points 122B, 122C define a second spacing $S_{C2}$. For the embodiment depicted, the first spacing $S_{C1}$ is equal to the second spacing $S_{C2}$.

In order to accommodate for the varied spacing of the attachment points 120, the pigtail fuel lines 106 include a varied length and a varied shape. For example, the first pigtail fuel line 106A extends a distance $X_1$ in a first direction and a distance $Y_1$ and a second direction, and similarly, the second pigtail fuel line 106B extends a distance $X_2$ in the first direction and a distance $Y_2$ and the second direction. The sum of the distance that the first pigtail fuel line 106A extends ($X_1$ plus $Y_1$) is not equal to the sum of the distance at the second pigtail fuel line 106B extends ($X_2$ plus $Y_2$). More particularly, the sum of the distance that the first pigtail fuel line 106A extends ($X_1$ plus $Y_1$) is less than the sum of the distance at the second pigtail fuel line 106B extends ($X_2$ plus $Y_2$).

It should be appreciated, however, that in other exemplary embodiments, the fuel delivery system 100 may not include both a varied spacing of the attachment points 120 and a varied geometry of the pigtail fuel lines 106. For example, in other embodiments, the fuel delivery system 100 may include a consistent spacing of the attachment points 120 and varied geometries of the pigtail fuel lines 106. With such an embodiment, the plurality of pigtail fuel lines 106 may define a similar length, but may still vary in shape.

Providing a fuel manifold having a varied spacing between connection points for the plurality of pigtail fuel lines and/or including pigtail fuel lines having varied geometries may reduce an amount of hydraulic instability within the fuel delivery system. More particularly, the inventors of the present disclosure have discovered that including one or both of a varied spacing between connection points and/or pigtail fuel lines having varied geometries, may break up an amount of hydro-mechanical fluid perturbations within the fuel delivery system, potentially reducing combustion dynamics, hardware damage, and limited operability.

The foregoing has described a fuel delivery system for a gas turbine engine combustor assembly. All of the features disclosed in this specification (including any accompanying claims, abstract and drawings) may be combined in any combination, except combinations where at least some of such features and/or steps are mutually exclusive.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel delivery system for a gas turbine engine comprising a combustion section and defining a circumferential direction, the combustion section of the gas turbine engine comprising a plurality of fuel nozzles, the fuel delivery system comprising:
   a feed tube;
   a fuel manifold comprising a first fuel manifold, a second fuel manifold, and a jumper fuel line, wherein the first and second fuel manifolds are fluidly connected to the feed tube for receiving fuel from the feed tube and arranged sequentially along the circumferential direction, wherein the jumper fuel line is fluidly connected to the first and second fuel manifolds;
   a plurality of pigtail fuel lines fluidly connected to the first fuel manifold and second fuel manifold, each pigtail fuel line configured to fluidly connect to a respective fuel nozzle of the plurality of fuel nozzles; and
   a means for damping a hydraulic instability within the fuel delivery system, wherein the means for damping the hydraulic instability within the fuel delivery system includes the jumper fuel line of the fuel manifold, wherein the jumper fuel line defines an outer diameter, wherein the first and second fuel manifolds each define an outer diameter, and wherein the outer diameter of the jumper fuel line is less than the outer diameters of the first and second fuel manifolds.

2. The fuel delivery system of claim 1, wherein the fuel manifold comprises an additional means for damping the hydraulic instability.

3. The fuel delivery system of claim 2, wherein the additional means for damping the hydraulic instability comprises an expansion damper of the fuel manifold.

4. The fuel delivery system of claim 3, wherein the fuel manifold defines a baseline inner diameter $D_B$ immediately upstream of the expansion damper and an expanded inner diameter $D_E$ within the expansion damper, wherein a ratio of the expanded inner diameter $D_E$ to the baseline inner diameter $D_B$ is greater than about 1.2 and less than about 4.

5. The fuel delivery system of claim 3, wherein the fuel manifold defines a baseline inner diameter $D_B$ immediately upstream of the expansion damper, wherein the expansion damper of the fuel manifold defines a length $L_{ED}$, wherein a ratio of the length $L_{ED}$ of the expansion damper to the baseline inner diameter $D_B$ is greater than about 5 and less than about 25.

6. The fuel delivery system of claim 2, wherein the additional means for damping the hydraulic instability further comprises a plurality of expansion dampers of the fuel manifold.

7. The fuel delivery system of claim 1, wherein the pigtail fuel line comprises an additional means for damping the hydraulic instability.

8. The fuel delivery system of claim 7, wherein the additional means for damping the hydraulic instability comprises an expansion damper of the pigtail fuel line.

9. The fuel delivery system of claim 8, wherein the pigtail fuel line defines a baseline inner diameter $D_B$ immediately upstream of the expansion damper and an expanded inner diameter $D_E$ within the expansion damper, wherein a ratio of the expanded inner diameter $D_E$ to the baseline inner diameter $D_B$ is greater than about 1.2 and less than about 4.

10. The fuel delivery system of claim 8, wherein the pigtail fuel line defines a baseline inner diameter $D_B$ immediately upstream of the expansion damper, wherein the expansion damper of the pigtail fuel line defines a length $L_{ED}$, wherein a ratio of the length $L_{ED}$ of the expansion damper to the baseline inner diameter $D_B$ is greater than about 5 and less than about 25.

11. The fuel delivery system of claim 7, wherein the pigtail fuel line is a first pigtail fuel line, wherein the fuel delivery system further comprises:
    a second pigtail fuel line fluidly connected to the fuel manifold and configured to fluidly connect to a nozzle of the plurality of fuel nozzles, wherein the first pigtail fuel line comprises a first geometry, wherein the second pigtail fuel line comprises a second geometry, wherein the means for damping the hydraulic instability comprises the first geometry of the first pigtail fuel line being distinct from the second geometry of the second pigtail fuel line.

12. A gas turbine engine defining a circumferential direction and comprising:
    a combustion section comprising a plurality of fuel nozzles; and
    a fuel delivery system comprising
       a feed tube;
       a fuel manifold comprising a first fuel manifold, a second fuel manifold, and a jumper fuel line, wherein the first and second fuel manifolds are fluidly connected to the feed tube for receiving fuel from the feed tube and arranged along the circumferential direction, wherein the jumper fuel line is fluidly connected to the first and second fuel manifolds, wherein the first fuel manifold defines a first downstream end, wherein the second fuel manifold defines a second downstream end, wherein the jumper fuel line is fluidly connected to the first fuel manifold at a location upstream of the first downstream end, and wherein the jumper fuel line is fluidly connected to the second fuel manifold at a location upstream of the second downstream end; and a plurality of pigtail fuel lines, each pigtail fuel line extending between and fluidly connecting the first fuel manifold or the second fuel manifold to a respective fuel nozzle of the plurality of fuel nozzles of the combustion section, and a means for damping a hydraulic instability within the fuel delivery system, wherein the means for damping the hydraulic instability within the fuel delivery system includes the jumper fuel line of the fuel manifold.

13. The gas turbine engine of claim 12, wherein at least one pigtail fuel line of the plurality of pigtail fuel lines comprises an additional means for damping the hydraulic instability, and wherein the additional means for damping the hydraulic instability comprises an expansion damper of the pigtail fuel line.

14. The gas turbine engine of claim 12, wherein the fuel manifold comprises an additional means for damping the hydraulic instability, and wherein the additional means for damping the hydraulic instability comprises an expansion damper of the fuel manifold.

15. The fuel delivery system of claim 1, wherein the plurality of pigtail fuel lines includes a first pigtail fuel line fluidly coupled to the first fuel manifold and a second pigtail fuel line fluidly connected to the second fuel manifold, the first and second pigtail fuel lines each configured to fluidly connect to a respective fuel nozzle of the plurality of fuel nozzles.

16. The fuel delivery system of claim 12, wherein the plurality of pigtail fuel lines includes a first pigtail fuel line fluidly coupled to the first fuel manifold and a second pigtail fuel line fluidly connected to the second fuel manifold, the first and second pigtail fuel lines each further fluidly connected to a respective fuel nozzle of the plurality of fuel nozzles.

17. The fuel delivery system of claim 12, wherein the plurality of pigtail fuel lines includes a first plurality of pigtail fuel lines fluidly coupled to the first fuel manifold and sequentially arranged along the first fuel manifold, and a second plurality of pigtail fuel lines fluidly connected to the second fuel manifold and sequentially arranged along the second fuel manifold.

18. The fuel delivery system of claim 17, wherein the jumper fuel line extends between the first fuel manifold and the second fuel manifold at a location downstream of the first plurality of pigtail fuel lines and downstream of the second plurality of pigtail fuel lines, and wherein the first fuel manifold is spaced from the second fuel manifold along the circumferential direction and connected through the jumper fuel line.

19. A fuel delivery system for a gas turbine engine comprising a combustion section and defining a circumferential direction, the combustion section of the gas turbine engine comprising a plurality of fuel nozzles, the fuel delivery system comprising:

a feed tube;

a fuel manifold comprising a first fuel manifold, a second fuel manifold, and a jumper fuel line, wherein the first and second fuel manifolds are fluidly connected to the feed tube for receiving fuel from the feed tube and are separate components arranged sequentially along the circumferential direction, wherein the jumper fuel line is a separate component from the first and second fuel manifolds and is fluidly connected to the first and second fuel manifolds;

a plurality of pigtail fuel lines fluidly connected to the first fuel manifold and second fuel manifold, each pigtail fuel line configured to fluidly connect to a respective fuel nozzle of the plurality of fuel nozzles; and a means for damping a hydraulic instability within the fuel delivery system, wherein the means for damping the hydraulic instability within the fuel delivery system includes the jumper fuel line of the fuel manifold.

20. The fuel delivery system of claim 19, wherein the first fuel manifold and the second fuel manifold are fluidly connected to the feed tube independently from one another through a first branch of the feed tube and a second branch of the feed tube, respectively.

* * * * *

UNITED STATES PATENT AND TRADEMARK OFFICE
CERTIFICATE OF CORRECTION

PATENT NO. : 11,092,084 B2
APPLICATION NO. : 15/164946
DATED : August 17, 2021
INVENTOR(S) : Kwanwoo Kim et al.

It is certified that error appears in the above-identified patent and that said Letters Patent is hereby corrected as shown below:

In the Claims

Claim 11, Column 12, Lines 37, 38, and 39, "a second pigtail fuel line fluidly connected to the fuel manifold and configured to fluidly connect to a nozzle of the plurality of fuel nozzles," should be -- a second pigtail fuel line fluidly connected to the fuel manifold and configured to fluidly connect to a fuel nozzle of the plurality of fuel nozzles, --

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*